United States Patent
Nakashima et al.

(12) 
(10) Patent No.: US 12,031,454 B2
(45) Date of Patent: Jul. 9, 2024

(54) METHOD FOR PRODUCING STEAM TURBINE MEMBER

(71) Applicant: FUJI ELECTRIC CO., LTD., Kawasaki (JP)

(72) Inventors: Yuya Nakashima, Hachioji (JP); Morio Chiwata, Sagamihara (JP); Susumu Ishimura, Akashi (JP); Yuta Fukuda, Nara (JP)

(73) Assignee: FUJI ELECTRIC CO., LTD., Kawasaki (JP)

( * ) Notice: Subject to any disclaimer, the term of this patent is extended or adjusted under 35 U.S.C. 154(b) by 1 day.

(21) Appl. No.: 17/683,859

(22) Filed: Mar. 1, 2022

(65) Prior Publication Data

US 2022/0178264 A1    Jun. 9, 2022

Related U.S. Application Data

(63) Continuation of application No. PCT/JP2021/010543, filed on Mar. 16, 2021.

(30) Foreign Application Priority Data

Mar. 30, 2020   (JP) ................ 2020-060302

(51) Int. Cl.
| | | |
|---|---|---|
| *F01D 5/28* | (2006.01) | |
| *B23K 26/073* | (2006.01) | |
| *B23K 26/082* | (2014.01) | |
| *B23K 26/144* | (2014.01) | |
| *B23K 26/34* | (2014.01) | |

(Continued)

(52) U.S. Cl.
CPC ............ *F01D 5/288* (2013.01); *B23K 26/073* (2013.01); *B23K 26/082* (2015.10); *B23K 26/144* (2015.10); *B23K 26/34* (2013.01); *B23K 26/354* (2015.10); *B23K 2101/001* (2018.08); *F05D 2220/31* (2013.01); *F05D 2230/31* (2013.01); *F05D 2240/31* (2013.01)

(58) Field of Classification Search
CPC ....... F01D 5/288; B23K 26/34; B23K 26/073; B23K 26/082; B23K 26/144; B23K 26/354
See application file for complete search history.

(56) References Cited

U.S. PATENT DOCUMENTS

2013/0032577 A1    2/2013   Lin et al.

FOREIGN PATENT DOCUMENTS

| JP | 62-183983 | 8/1987 |
|---|---|---|
| JP | 11-775 | 1/1999 |

(Continued)

OTHER PUBLICATIONS

International Search Report, dated May 18, 2021, in corresponding International Patent Application No. PCT/JP2021/010543 (2 pp.).

(Continued)

*Primary Examiner* — Justin D Seabe
*Assistant Examiner* — John S Hunter, Jr.

(57) ABSTRACT

The present invention provides a method for producing a steam turbine member that is highly superior in smoothness. The present invention provides a method for producing a steam turbine member including a cladding layer forming step of forming a cladding layer from a powdered material containing a metal in a region of a base material in which corrosion easily occurs, and a surface heating step of heat-melting a surface of the cladding layer.

10 Claims, 4 Drawing Sheets

(51) Int. Cl.
*B23K 26/354* (2014.01)
*B23K 101/00* (2006.01)

(56) References Cited

FOREIGN PATENT DOCUMENTS

| JP | 2017-125483 | 7/2017 |
| JP | 2018-9551 A | 1/2018 |

OTHER PUBLICATIONS

Form PCT/ISA/237 (Written Opinion), dated May 18, 2021 (3 pp.), in corresponding International Patent Application No. PCT/JP2021/010543.
Wikipedia contributors, 'Cladding (metalworking)', Wikipedia, The Free Encyclopedia, printed Oct. 16, 2023, <https://en.wikipedia.org/w/index.php?title=Cladding_(metalworking)&oldid=1169993814>.
English translation of JP 2017-125483 A, Nakashima et al., printed Feb. 15, 2024 https://www.j-platpat.inpit.go.jp/c1800/PU/JP-2017-125483/2D61B3DBBA3D3A9369487576D1AF75F07639EF62679F182ACB29A49AECF75279/11/en.
Japanese Office Action dated Jan. 16, 2024 for Japanese Application No. 2020-060302.

METHOD FOR PRODUCING STEAM TURBINE MEMBER

CROSS REFERENCE TO RELATED APPLICATIONS

This application is a continuation of International Patent Application No. PCT/JP2021/010543 filed Mar. 16, 2021, which claims the priority benefit of Japanese Patent Application No. 2020-060302 filed Mar. 30, 2020, the contents of each of which are incorporated herein by reference.

TECHNICAL FIELD

The present invention relates to a method for producing a steam turbine member, and relates to a steam turbine member. Specifically, the present invention relates to a method for producing a steam turbine member very superior surface smoothness, and relates to a steam turbine member.

BACKGROUND ART

In general, in a steam turbine, erosion abrasion is caused by droplets condensed from steam colliding with a steam turbine member, particularly at a front edge portion (at a steam inlet side) of a low-pressure stage blade or the like of the turbine. To reduce the erosion abrasion, for example, at a blade front edge portion that may be eroded by erosion, a base material is subjected to a hardening treatment with a blowtorch, high frequency induction heating, or laser heating to improve erosion resistance of the blade front edge portion, and a hardened layer is usually formed at a front edge portion of a steam turbine blade.

In particular, steam for driving a turbine used in geothermal power generation contains a large number of corrosive chemicals mixed therein, and not only the abrasion resistance, but also corrosion resistance, is demanded. Therefore, there is a known technique in which a coating layer of an alloy that is superior in both abrasion resistance and corrosion resistance, such as Stellite (registered trademark), is formed by brazing on a base material of a turbine blade. A plate-shaped corrosion resistant alloy is subjected to bending processing in accordance with a complicated curved shape of a turbine blade for use in this brazing. The bending process for following a complicated curved shape requires technical expertise, and hence, it is difficult to maintain the quality in some cases.

Techniques for solving the problem of following a complicated shape are known, in which a cladding layer of Stellite is formed by laser cladding on a turbine blade (see, for example, Patent Documents 1 and 2). This method has advantages in that heat input is easily controlled, fine processing can be performed, and various blade shapes can be followed.

REFERENCE DOCUMENT LIST

Patent Documents

Patent Document 1: Japanese Patent Application Laid-open No. Hei 11-775 (1999-775) A
Patent Document 2: Japanese Patent Application Laid-open No. 2017-125483 A

SUMMARY OF THE INVENTION

Problem to be Solved by the Invention

In the cladding executed in Patent Document 1, however, a surface of the layer formed by the cladding has unevenness caused by beads piled up in the cladding or unevenness caused by the remainder of a material powder. Such unevenness deforms an optimized hydrodynamic shape of a turbine blade and causes a problem in that efficiency for generating a rotational force from steam, that is, power generation efficiency, is reduced. To cope with the unevenness, a process of shaving the cladding layer by machining, such as grinding, is performed to restore it to the original shape of the turbine blade. For performing this process, it is necessary to form the cladding layer with a greater thickness than necessary, and in addition, the machining increases the number of processes. Accordingly, the cladding has a problem of increased cost.

Patent Document 2 discloses that laser irradiation is performed, after forming a cladding layer, at a power that will not melt the surface of the cladding layer, but this process does not affect unevenness on the surface of the cladding layer, and hence the problem of requiring postprocessing is not solved.

In addition, a similar problem can occur not only in a turbine blade but also in another member of a steam turbine.

To solve these problems, the present invention provides a method for producing a steam turbine member having a cladding layer having a smooth surface, without performing complicated operations such as machining.

Means for Solving the Problems

In one aspect, the present invention is a method for producing a steam turbine member, having a cladding layer forming step of forming a cladding layer from a powdered material containing a metal in a region of a base material in which corrosion easily occurs, and a surface heating step of heat-melting a surface of the cladding layer.

In the method for producing a steam turbine member, the cladding layer forming step preferably includes a laser cladding step of performing laser irradiation while spraying the powdered material onto the base material, and the surface heating step preferably includes a step of heat-melting by laser irradiation of a portion from the surface to a depth equal to or greater than the most frequent value of a particle size distribution of the powder material.

In the method for producing a steam turbine member, the heat-melting preferably reaches 100 to 200 μm in depth.

In the method for producing a steam turbine member, the laser irradiation in the surface heating step is preferably performed with a laser spot area less than 200 $mm^2$.

In the method for producing a steam turbine member, a scanning speed in the laser irradiation in the surface heating step is preferably 400 to 600 mm/min.

In another aspect, the present invention relates to a steam turbine member produced by any one of the methods for producing a steam turbine member described above.

In still another aspect, the present invention relates to a steam turbine member including a corrosion resistant region in which a cladding layer is formed on a base material, in which a portion is melted from a surface of the cladding layer to a depth of 100 to 200 μm.

In the steam turbine member, the cladding layer has a maximum height roughness Rz of preferably 6.3 μm or less. The steam turbine member is preferably a steam turbine blade.

Effects of the Invention

According to the present invention, a cladding layer formed in a region of a steam turbine member in which corrosion easily occurs is subjected to local heating, and thus, a surface of the cladding layer is melted to eliminate unevenness. Thus, the surface of the cladding layer can be smoothed without performing postprocessing by machining, which was impossible in execution of conventional cladding, and hence, a cladding layer can be formed at low cost because cost increase of a powdered material caused by excess metal used in consideration of processing allowance or cost of postprocessing is not necessary.

MODE FOR CARRYING OUT THE INVENTION

Figure 1:
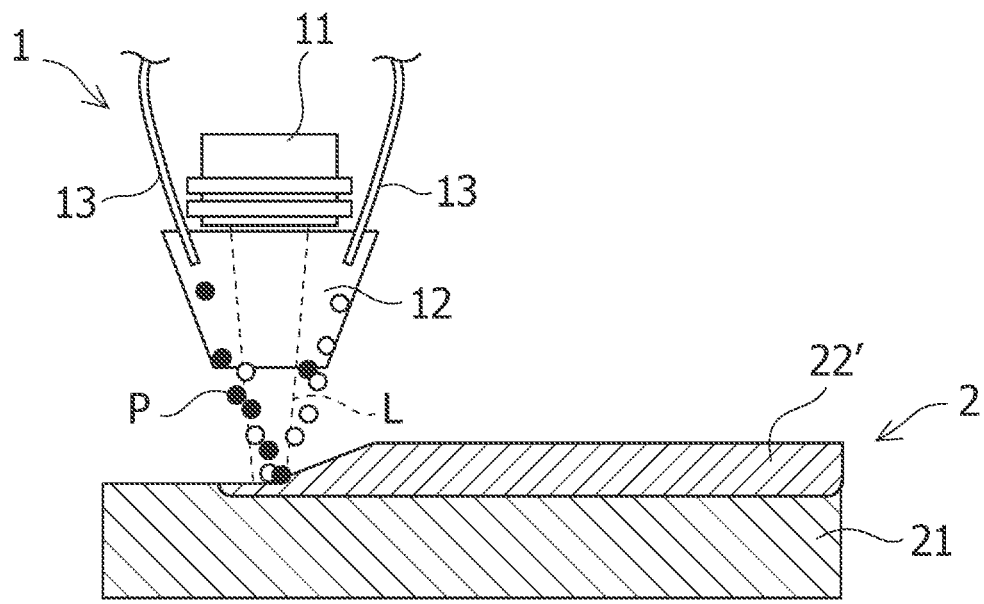
FIG. 1 is a schematic diagram illustrating a method for producing a steam turbine member according to one embodiment of the present invention.

Now, embodiments of the present invention will be described with reference to the accompanying drawings. It is to be noted that the present invention is not limited to the following embodiments. In addition, the drawings are merely exemplified schematic diagrams for describing the present invention, and dimensions and a relative positional relationship of respective members illustrated in the drawings do not limit the present invention.

First Embodiment: Method for Producing Steam Turbine Member

According to the first embodiment, the present invention is a method for producing a steam turbine member, including a cladding layer forming step (hereinafter also referred to as the first step) of forming a cladding layer from a powder material containing a metal in a region of a base material in which corrosion easily occurs, and a surface heating step (hereinafter also referred to as the second step) of heat-melting a surface of the cladding layer.

FIG. 1 schematically illustrates a method for producing a steam turbine member according to one embodiment of the present invention. The present invention will be described by exemplifying production of a steam turbine blade as an example of the steam turbine member in FIG. 1, but the present invention is not limited to the method for producing a steam turbine blade. A steam turbine blade 2 to be produced includes a base material 21, and a cladding layer 22 formed on a part thereof. A laser cladding apparatus 1 usable in the first and second steps is disposed to oppose the steam turbine blade 2, that is, a material to be processed.

The first step will be described. As the base material 21 of the steam turbine blade 2, a stainless steel that is superior in corrosion resistance and erosion abrasion resistance can be used, and in particular, a stainless steel selected from ferritic stainless steel, martensitic stainless steel, and precipitation hardening stainless steel is preferably used. In addition, as the base material 21 of a steam turbine blade for geothermal power generation in particular, martensitic stainless steel is more preferably used from the viewpoint of corrosion resistance. Such a prescribed material can be formed into a desired blade shape to be used as the base material 21 according to the present embodiment. The cladding layer 22 may be formed directly on the material having been processed into the blade shape, or a part of the base material 21 may be cut out to form the cladding layer 22 in the shape of a cut portion. Before the first step, the base material 21 may be subjected, if necessary, to a physical surface treatment such as polishing with sandpaper, or another surface treatment not affecting properties such as strength of the base material.

Figure 2A:
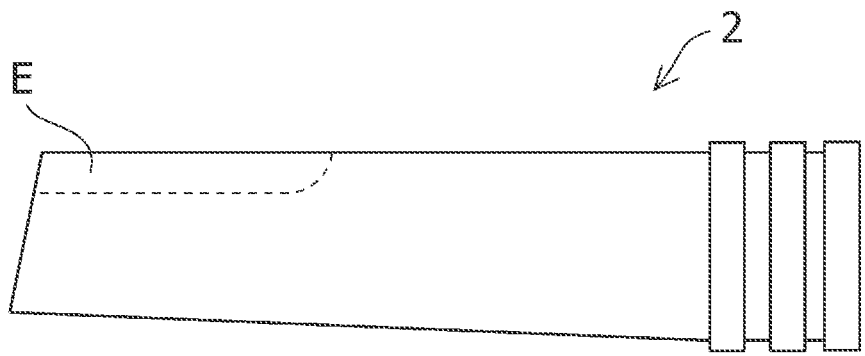
FIG. 2A is a diagram of a region of a steam turbine blade in which corrosion easily occurs.
Figure 2B:
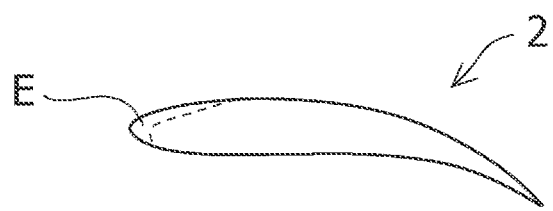
FIG. 2B is a diagram of a region of a steam turbine blade in which corrosion easily occurs.

A region of the base material 21 in which the cladding layer 22 is formed may be a region in which corrosion easily occurs when used as a steam turbine blade, or may be, for example, a region in the vicinity of a blade tip in which peripheral speed is increased, or a region having a small thickness such as a peripheral region, and is representatively a blade front edge portion, although it is not limited to this. FIGS. 2A and 2B are diagrams schematically illustrating a region of a general type of steam turbine blade in which corrosion easily occurs. FIG. 2A is a front view of the steam turbine blade 2, and FIG. 2B is a cross sectional view of a blade tip. In either of the drawings, the blade front edge portion corresponds to a region E in which corrosion easily occurs. The cladding layer 22 can be formed in this region E.

The cladding layer 22 can be formed by cladding using a laser beam or a high-density energy beam, and from the viewpoint of versatility of an apparatus, is preferably formed by laser cladding. In FIG. 1, the laser cladding apparatus 1 is illustrated as an example of an apparatus used for performing the first step.

A material used for forming the cladding layer 22 is a powder material containing a metal. Accordingly, a metal material powder, and preferably a corrosion resistant alloy powder, can be used alone. Alternatively, both a metal material powder, and preferably a corrosion resistant alloy powder, and a ceramic powder, can be used.

Examples of the metal material powder include, but are not limited to, corrosion resistant alloys of Co, Ni, Fe, Cr, Mo, V, Ti, and Nb. In particular, for example, a cobalt-based alloy or a nickel-based alloy can be preferably used. As the cobalt-based alloy, Stellite (registered trademark), which is an alloy containing cobalt as a principal component, and further containing chromium and tungsten, or a composite material containing Stellite, can be used. Alternatively, Tribaloy (registered trademark) that is an alloy containing cobalt as a principal component, and further containing chromium and molybdenum, or a composite material containing Tribaloy can be used. As the nickel-based alloy, Hastelloy (registered trademark) that is an alloy containing nickel as a principal component, and further containing molybdenum, chromium or the like, or a composite material containing Hastelloy, can be used. Examples of Hastelloy include, but are not limited to, Hastelloy C4, C2000, C22, C276, BC-1, G3, N, and X. Alternatively, Inconel (registered trademark) that contains nickel as a principal component, and further contains iron, chromium, niobium, and molybdenum, or a composite material containing Inconel can be used, although it is not limited to this. Such a corrosion resistant metal material powder imparts corrosion resistance to the cladding layer 22, and can prevent rust. Merely one of these metal material powders may be used, or a mixture of two or more of these can be used.

Examples of the ceramic material powder include, but are not limited to, tungsten carbide (WC or $W_2C$), NbC, VC, CrC, and MoC. In addition, the ceramic material powder encompasses a cermet which is a composite material of a ceramic and a metal, and examples include, but are not limited to, a WC/Ni cermet, a WC/Co cermet, and a WC/Co/Cr cermet. One of these ceramic material powders may be used alone, or a mixture of two or more of these can be used.

Average particle size and particle size distribution of the ceramic material and metal material powders, and a blending ratio of these powders can be appropriately selected in accordance with the purpose by those skilled in the art.

A forming thickness of a cladding layer 22' is not particularly limited, and it can be appropriately determined by those skilled in the art in accordance with necessary specifications and the like of the steam turbine blade 2. When the cladding layer 22' is too thin, corrosion resistance and abrasion resistance may be insufficient in some cases, and when it is too thick, it can be easily broken due to strain in some cases. In addition, the cladding layer 22' may have a single layer structure of the same material, or it may be formed in a multi-layer structure including two or more cladding layers, each having different compositions.

When laser cladding is performed with the laser cladding apparatus 1, a laser beam L is irradiated from a cladding laser 11, and a material powder P containing a metal is supplied from a powder supply nozzle 12 with a carrier gas (not shown). Thus, the material powder P is melted and bonded on the base material 21, so that the cladding layer 22 can be formed. When a ceramic material powder is used in addition to a metal material powder, or two or more ceramic material powders or metal material powders are used, two or more, for example, four supply lines 13 through which the powder materials can each be pumped with a carrier gas are connected to the powder supply nozzle 12 to supply freely chosen material powders P through these supply lines 13 to be homogeneously mixed through the powder supply nozzle 12, and thus, the cladding can be performed.

As the cladding laser 11, a semiconductor laser is preferably used. Laser irradiation conditions can be determined based on the compositions of the base material and the powders, the curvature of the base material, and the like, and various conditions to be employed in the laser cladding can be appropriately set by those skilled in the art.

Figure 3A:
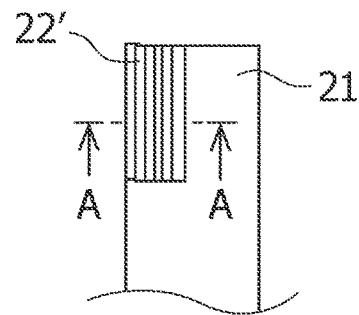
FIG. 3A is a schematic diagram of a part of a steam turbine having a cladding layer formed therein, and is a schematic plan view of a surface of the steam turbine having the cladding layer formed thereon.
Figure 3B:
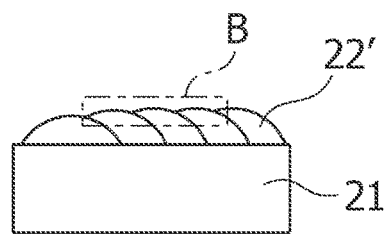
FIG. 3B is a cross sectional view taken along line A-A of FIG. 3A.

The shape of the surface of the cladding layer obtained after completing the first step is illustrated in FIGS. 3A and 3B. FIG. 3A is a schematic plan view of the surface on which the cladding layer 22' is formed, and FIG. 3B is a schematic cross-sectional view taken along line A-A of FIG. 3A. On the surface of the cladding layer 22', level differences among cladding beads caused by laser scanning, and the remainder of the supplied powder are found. The level differences among beads can be expressed as average unevenness. The average unevenness in the present invention refers to a value of an average of differences obtained by measuring, in inverted V-shapes obtained in a waviness profile, level differences between ridges and valleys of the respective inverted V-shapes. In addition, a maximum height roughness Rz of the cladding layer 22' after completing the first step is 200 μm or more in some cases. The maximum height roughness Rz in the present invention refers to a value measured with a stylus type surface roughness tester. It is noted that the average unevenness and the maximum height roughness Rz of the surface of the cladding layer 22' after completing the first step are merely illustrative and do not limit the present invention.

After the first step, the second step, that is, the surface heating step of heat-melting the surface of the cladding layer 22', is performed. After completing the first step, the second step is preferably subsequently performed, and the second step is preferably performed on the material to be processed in which the cladding layer 22' has a temperature of about 400° C. to 1200° C. as a result of the first step.

In the second step, the cladding layer 22' is subjected to laser irradiation to heat-melt the surface of the cladding layer 22'. The laser irradiation is performed under conditions in which the entire cladding layer is not melted, and only the surface of the cladding layer is heat-melted. A state in which the cladding layer is "heated and melted" refers to a state in which particles forming the cladding layer are heat-melted to have a particle size 7% or more smaller than the particle size of the particles before forming the cladding layer. The comparison of the particle size can be performed based on cross sectional structure observation of the cross section of the cladding layer with an electron microscope. Specifically, the cross-sectional structure observation is performed to observe about 50 particles, and an average of the particle sizes of all the particles is calculated. At this point, the number of observation fields is 3.

After the second step, heat-melting the surface of the cladding layer 22 preferably results in a state in which a portion from the outermost surface of the cladding layer 22, that is, a surface in contact with the air, to a depth equal to or greater than the mode of the particle size distribution of the powder material is heat-melted. Also, when the powder material contains two or more powders of a metal material powder and a ceramic material powder, a portion down to a depth equal to or greater than the most frequent value of the particle size distribution among those of the powders is preferably in a state melted by heating. For example, the melting depth may be about 100 to 200 μm, and more preferably about 100 to 150 μm from the outermost surface of the cladding layer, this is not limited to a specific value. Such a specific melting depth is employed for ensuring corrosion resistance of the cladding layer.

In the laser irradiation in the second step, a semiconductor laser is preferably used. In this step, the cladding laser 11 included in the cladding apparatus 1 used in the first step can be used. In this regard, this method is advantageous because there is no need to separately prepare a laser oscillator having different specifications for performing the second step. Accordingly, the wavelength of the laser can be similar to that of the cladding laser 11. A laser output power is not limited to a specific value, and it can be appropriately determined by those skilled in the art based on the material to be irradiated, the material of the base material, and other conditions for the laser irradiation to satisfy the conditions for the melting depth. A laser spot area is less than 200 mm$^2$, is preferably less than 100 mm$^2$, and is preferably less than 50 mm$^2$, and it can be 10 mm$^2$ or more, although this is not so limited. The laser irradiation is performed with many lines so that all spots on the entire cladding layer 22' formed in the first step can be scanned without omission. Scanning speed is preferably 400 to 600 mm/min.

On the cladding layer 22 having the surface melted by heating in the second step, the level differences among cladding beads and the remainder of the supplied powder present on the cladding layer 22' after completing the first step are substantially not found. For example, average unevenness of the surface of the cladding layer after the second step can be, for example, 70 μm or less. The maximum height roughness Rz can be, for example, 6.3 μm or less, and preferably 3 μm or less.

In the method for producing a steam turbine member according to the present embodiment, a steam turbine member having a smooth surface and which is very superior in power generation efficiency can be produced. In addition, in the method for producing a steam turbine member according to the present embodiment, the steam turbine member can be improved in reliability and service life. In particular, when the steam turbine member is a turbine blade, any type of steam turbine blade can be produced, and examples include a steam turbine blade for thermal power generation, and a steam turbine blade for geothermal power generation. In particular, a steam turbine blade for geothermal power generation to be brought into contact with gas containing a large amount of sulfur and chlorine components is required of high corrosion resistance. The production method of the present embodiment is highly advantageous because a steam turbine blade including a cladding layer having a smooth surface, and which is very superior in power generation efficiency, can be produced. In particular, with the corrosion resistance ensured by a ceramic composite cladding layer, a shape having smoothness and which is advantageous in fluid design can be employed, and thus, deterioration of power generation efficiency can be prevented.

The method for producing a steam turbine member according to the present embodiment encompasses, in addition to production of a steam turbine member to be newly produced, a method for repairing a steam turbine member. In this case, a part of a base material is subjected to a polishing treatment, or the like, if necessary, and then, the first step and the second step are performed at a necessary portion in the same manner as in the production method of the present embodiment to repair and produce a steam turbine member.

According to the production method of the present embodiment, a surface smoothing treatment is performed using a laser in a region of a steam turbine member having been subjected to cladding, and thus, a turbine member having a cladding layer excellent in surface smoothness can be obtained without requiring complicated grinding processing or the like.

The production method described above can be similarly applied to a method for producing a steam turbine member different from a steam turbine blade, which encompasses, but is not limited to, a rotor of a steam turbine, a stationary blade holder, a valve rod, a valve body, a valve seat, a bush, and an airtight ring. Also with respect to these members, a turbine member having a cladding layer that is superior in surface smoothness can be obtained by performing the step of forming a cladding layer in a region of a prescribed base material in which corrosion easily occurs, and the surface heating step of heat-melting the surface of the cladding layer. The region in which corrosion or abrasion easily occurs is varied among the members, and for example, in a turbine rotor, the region in which corrosion easily occurs is a surface sliding on a bearing, and the cladding layer can be formed on this region. A region of each member in which corrosion or abrasion easily occurs can be usually understood by those skilled in the art, and a region in which the cladding layer is to be formed can be appropriately determined. Also, in these members, surface smoothness can have an effect of contributing to improvement of power generation efficiency.

Second Embodiment: Steam Turbine Member

According to the second embodiment, the present invention is a steam turbine member including a corrosion resistant region in which a cladding layer is formed on a base material, and a surface portion of the cladding layer to a depth of 100 to 200 μm is melted. The steam turbine member of the present embodiment is a steam turbine member produced by the production method of the first embodiment. A state in which the surface portion to a depth of 100 to 200 μm is melted is defined as described in the first embodiment. Such a melted state can be inspected by observing a cross section of the cladding layer with a scanning microscope or the like. Also, in the present embodiment, examples of the steam turbine member include, but are not limited to, the members described in the first embodiment.

In the steam turbine member of the second embodiment, the cladding layer has a maximum height roughness Rz of preferably 6.3 μm or less, and more preferably 3 μm or less. The maximum height roughness Rz refers to a value measured with a stylus-type surface roughness tester.

The steam turbine member of the present embodiment has smoothness, and has a surface melting is minimized, and therefore, power generation efficiency and corrosion resistance can both be attained.

Example

Now, the present invention will be described in detail with reference to an example. It is noted, however, that the present invention is not limited to the following example.

Example

A steam turbine blade that is an example of the steam turbine member was produced by the method including the first step and the second step according to the first embodiment of the present invention. A base material of the turbine blade was made of 13 chromium alloy steel (martensitic stainless steel) having been processed into a desired shape. The 13 chromium alloy steel was polished with #80 grit sandpaper in advance for suppressing variation in a laser absorptance. As the cladding laser, a semiconductor laser (Laserline GmbH) oscillating at a wavelength of 940 and 980±10 nm was used. Height of a laser head was adjusted so that a laser focus position accorded with a surface of the base material of the turbine blade. As a metal material powder, Hastelloy C276 having a particle size distribution of 44 to 105 μm was used, as a ceramic powder, a WC/Ni cermet having a particle size distribution of 45 to 90 μm was used, and the metal material powder and the ceramic powder were quantitatively supplied with a carrier gas (argon gas) through a nozzle attached to the laser head. A powder supply rate for the metal material powder was 10 g/min, and a powder supply rate for the ceramic material powder was 10 g/min. In addition, cladding was performed with the base material fixed and a laser cladding apparatus set to be movable, and a feed rate was 500 mm/min. Under these conditions, laser beam irradiation was performed with the metal material powder and the ceramic powder supplied along a region of the turbine blade in which abrasion occurs (region E of FIGS. 2A and 2B), and thus, the cladding layer 22' was formed.

Figure 4:
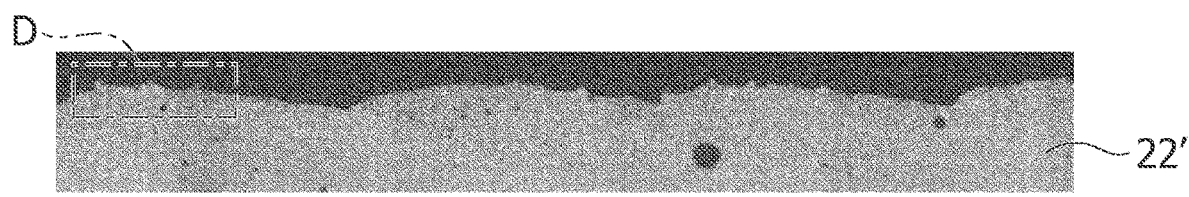
FIG. 4 is an image of a cross section of a cladding layer taken after completing a first step and before performing a second step in an example of the present invention.
Figure 5:
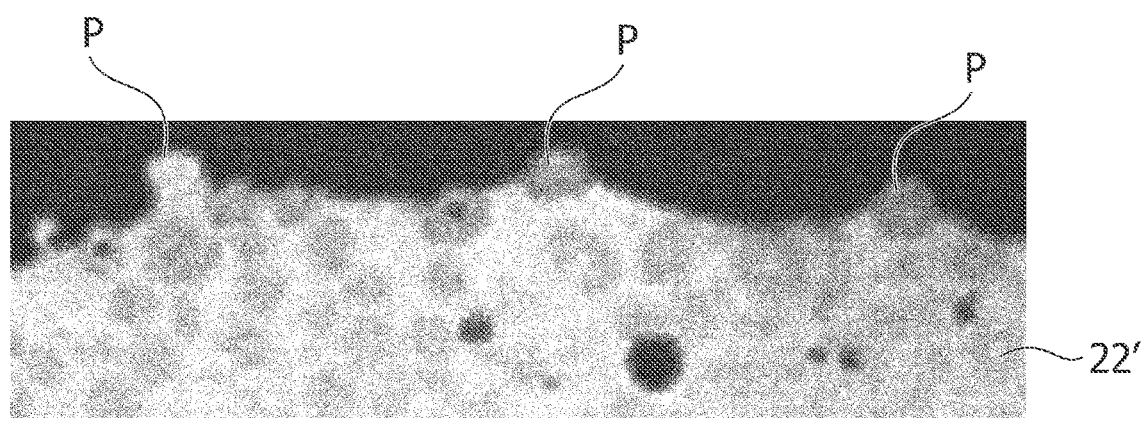
FIG. 5 is an image obtained by scanning microscope of the cross section of the cladding layer taken after completing the first step and before performing the second step in the example of the present invention, in which a portion D of FIG. 4 is enlarged.
Figure 6A:
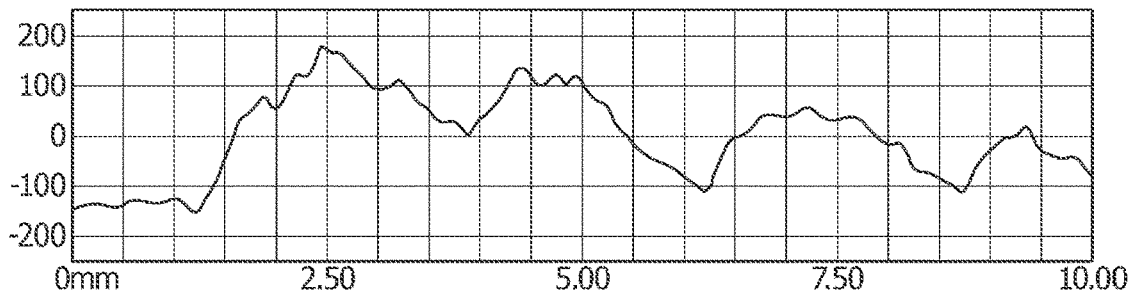
FIG. 6A is a graph illustrating a measurement result of a surface state of the cladding layer obtained after completing the first step and before performing the second step in the example of the present invention, in which a wave filtration waviness profile is illustrated in units of μm on the ordinate, with a vertical magnification factor of 100× and a lateral magnification factor of 20×.
Figure 6B:
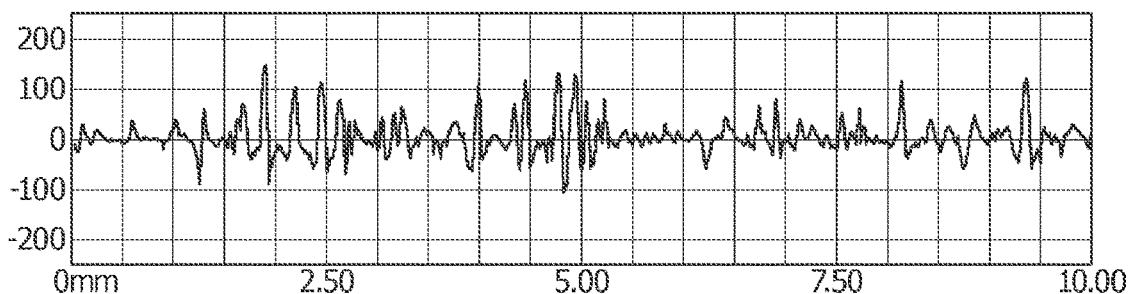
FIG. 6B is a graph illustrating a measurement result of a surface state of the cladding layer obtained after completing the first step and before performing the second step in the example of the present invention, in which a roughness profile is illustrated in units of μm on the ordinate, with a vertical magnification factor of 500× and a lateral magnification factor of 20×.

FIG. 4 is an image of a cross section of the cladding layer 22' obtained after completing the first step and before performing the second step. On the surface of the cladding layer 22', level differences among beads due to laser scanning were visually recognized. FIG. 5 is an image obtained by scanning microscope of a portion D of FIG. 4. There was the remainder of the supplied powders P on the surface of the cladding layer 22'. A waviness profile on the surface of the cladding layer 22' was measured by the method defined above, and the maximum height roughness Rz was measured with a stylus-type surface roughness tester. Graphs thus obtained are shown in FIGS. 6A and 6B. Average unevenness based on the waviness profile illustrated in FIG. 6A was 246 μm, and a maximum height roughness Rz based on a roughness profile illustrated in FIG. 6B was 20.352 μm.

Next, subsequently after forming the cladding layer 22' in the first step, the surface heating step (second step) of performing laser irradiation of the surface of the cladding layer 22' was performed. In the laser irradiation in the surface heating step, the same semiconductor laser oscillator as that used in the laser cladding was used. The laser irradiation was performed with a size of a laser spot of a 5 mm square area, a laser output power of 850 W, and a rate of 500 mm/min.

Figure 7:
FIG. 7 is an image of a cross section of a cladding layer produced by a method of the present invention, and is an image of a portion corresponding to a portion B of FIG. 3B.
Figure 8A:
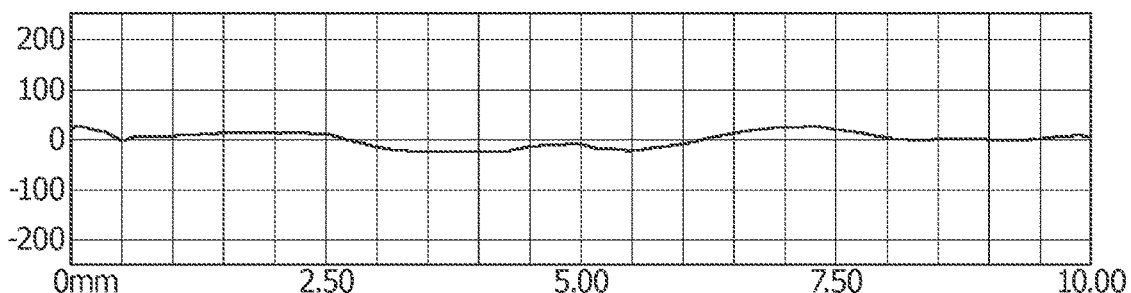
FIG. 8A is a graph illustrating a measurement result of a surface state of a steam turbine blade of the example of the present invention, in which a filtered waviness profile is illustrated in units of μm on the ordinate, with a vertical magnification factor of 100× and a lateral magnification factor of 20×.
Figure 8B:
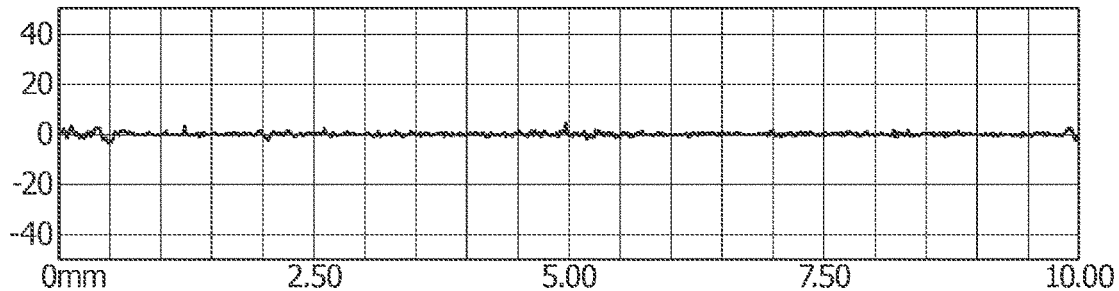
FIG. 8B is a graph illustrating a measurement result of a surface state of the steam turbine blade of the example of the present invention, in which a roughness profile is illustrated in units of μm on the ordinate, with a vertical magnification factor of 500× and a lateral magnification factor of 20×.

FIG. 7 is an image of a cross section of the cladding layer 22 obtained after completing the second step. By the laser irradiation, the surface was smoothed, and there were no level differences. A waviness profile on the surface of the cladding layer 22 was measured by the method defined above, and the maximum height roughness Rz was measured with a stylus type surface roughness tester. Graphs thus obtained are shown in FIGS. 8A and 8B. Average unevenness based on the waviness profile illustrated in FIG. 8A was 61 μm, and a maximum height roughness Rz based on a roughness profile shown in FIG. 8B was 2.404 μm. This surface roughness is not more than 6.3 μm as a surface finish roughness Rz obtained by postprocessing (machining), and thus, it is understood that a sufficiently smooth surface could thus be obtained.

Figure 9:
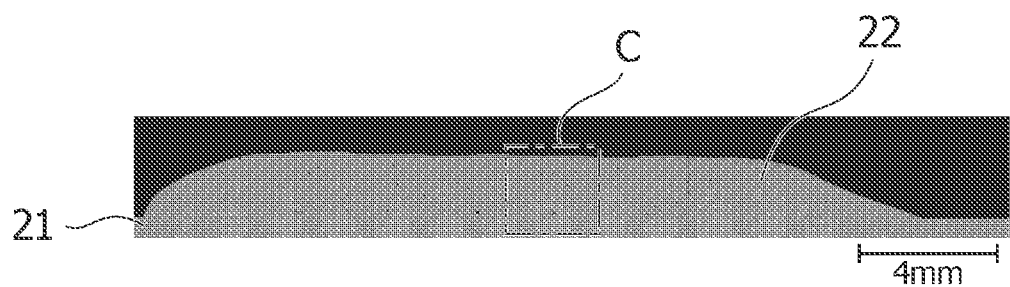
FIG. 9 is an image of a cross section of a cladding layer produced in the example of the present invention.
Figure 10:
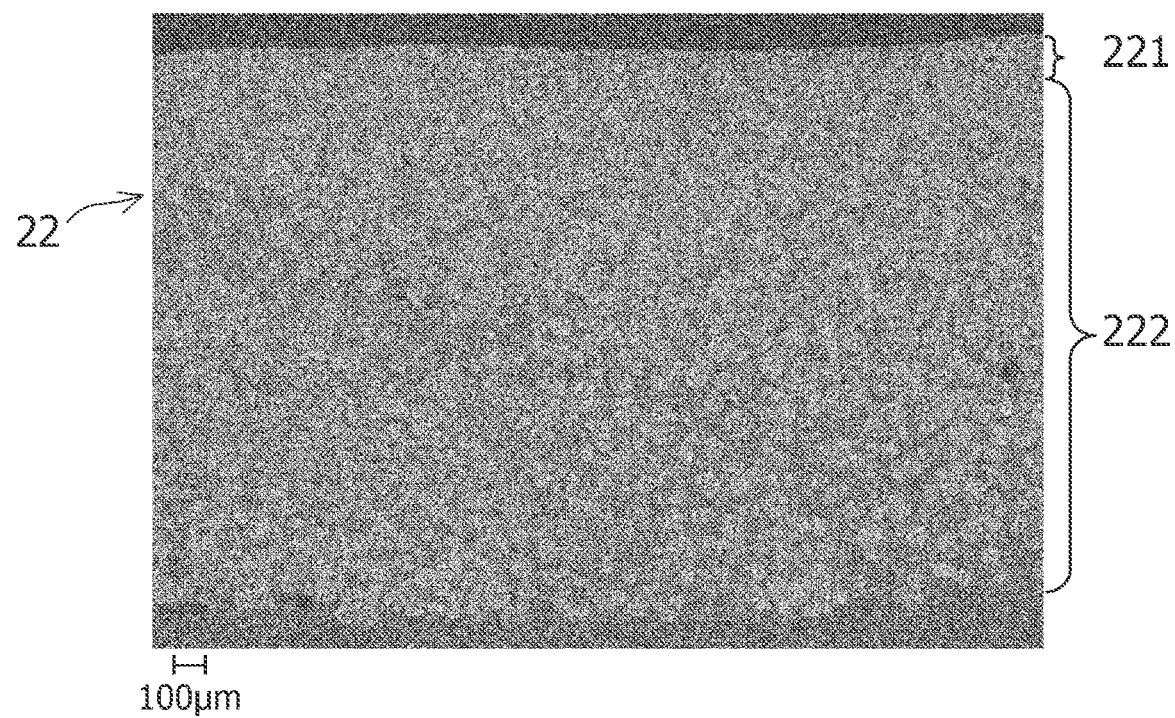
FIG. 10 is an image obtained by scanning microscope, enlarged 40 times, of a portion C of FIG. 9.

FIG. 9 is an image of a cross section of the thus obtained cladding layer, and FIG. 10 is an image of a portion C of FIG. 9 obtained by observation with a scanning microscope. It was confirmed, based on FIG. 10, that after completing the second step, a depth of a portion 221 melted by the laser irradiation in the cladding layer 22 was about 120 μm. In order to attain both corrosion resistance and abrasion resistance of the cladding layer 22 of this example, the metal material powder alone was melted without substantially melting the ceramic powder. After forming the cladding layer 22' in the first step, if the ceramic powder is excessively melted by the laser irradiation in the second step, there may arise a problem of deterioration of corrosion resistance. In this example, however, a melted portion 221 of the ceramic powder was only a very top layer (110 μm), and a portion 222 in which the ceramic powder was not melted had a thickness of 1900 μm. This reveals that a cladding layer having a smooth surface could be obtained while ensuring corrosion resistance that is a necessary function of a cladding layer.

REFERENCE SYMBOL LIST

1 Laser cladding apparatus
11 Cladding laser
12 Powder supply nozzle
13 Powder supply line
2 Steam turbine blade
21 Base material
22 Cladding layer
P Powder material particle
L Laser
E Region in which corrosion easily occurs

The invention claimed is:

1. A method for producing a steam turbine member, comprising:
    forming a cladding layer from a powder material containing a metal in a region of a base material in which corrosion easily occurs; and
    heat-melting an outermost surface of the cladding layer after forming the cladding layer.

2. A steam turbine member produced by the method according to claim 1.

3. A method for producing a steam turbine member, comprising:
    forming a cladding layer from a powder material containing a metal in a region of a base material in which corrosion easily occurs; and
    heat-melting a surface of the cladding layer, wherein
    the forming a cladding layer includes performing laser irradiation while spraying the powder material onto the base material, and
    the heat-melting a surface includes heat-melting by laser irradiation of a portion from the surface to a depth equal to or greater than the most frequent value of a particle size distribution of the powder material.

4. The method according to claim 3, wherein the heat-melting reaches 100 to 200 μm in depth.

5. The method according to claim 3 or 4, wherein the laser irradiation in the heat-melting a surface is performed with a laser spot area less than 200 mm².

6. The method according to claim 3 or 4, wherein a scanning speed in the laser irradiation in the heat-melting a surface is 400 to 600 mm/min.

7. A steam turbine member produced by the method according to claim 3.

8. A steam turbine member comprising a corrosion resistant region in which a cladding layer is formed on a base material, wherein a portion from a surface of the cladding layer to a depth of 100 to 200 μm is melted.

9. The steam turbine member according to claim 8, wherein the cladding layer has a maximum height roughness Rz of 6.3 μm or less.

10. The steam turbine member according to claim 8 or 9, wherein the steam turbine member is a turbine blade.

* * * * *